United States Patent
Kuzmic et al.

(10) Patent No.: US 11,859,681 B2
(45) Date of Patent: Jan. 2, 2024

(54) REAR BRAKE CALIPER PRESS

(71) Applicant: A & E INCORPORATED, Racine, WI (US)

(72) Inventors: Jeffrey J. Kuzmic, Wind Lake, WI (US); Billy Greuel, Waterford, WI (US)

(73) Assignee: A & E INCORPORATED, Racine, WI (US)

( * ) Notice: Subject to any disclaimer, the term of this patent is extended or adjusted under 35 U.S.C. 154(b) by 0 days.

(21) Appl. No.: 17/508,304

(22) Filed: Oct. 22, 2021

(65) Prior Publication Data

US 2023/0128668 A1    Apr. 27, 2023

(51) Int. Cl.
*F16D 65/00*    (2006.01)

(52) U.S. Cl.
CPC ................................ *F16D 65/0043* (2013.01)

(58) Field of Classification Search
CPC ......... Y10T 29/53848; Y10T 29/53857; F16D 65/0043
See application file for complete search history.

(56) References Cited

U.S. PATENT DOCUMENTS

| | | | | |
|---|---|---|---|---|
| 2,287,767 A * | 6/1942 | Dodge | ................... | B25B 27/06 29/256 |
| 3,835,522 A | 9/1974 | Ward | | |
| 5,003,681 A * | 4/1991 | Schley | ................... | B25B 13/48 81/176.1 |
| 5,018,261 A * | 5/1991 | Markous | ............... | B25B 27/023 29/266 |
| 5,850,680 A * | 12/1998 | Verrier | ................ | B25B 27/0021 29/257 |
| 6,029,550 A | 2/2000 | Williams | | |
| 6,678,931 B1 | 1/2004 | Tatasciore | | |
| 7,155,792 B1 | 1/2007 | Miller, Jr. | | |
| 8,393,063 B2 | 3/2013 | Hodges et al. | | |
| 8,661,638 B2 * | 3/2014 | Chen | ................... | F16D 65/0043 81/52 |
| 9,174,330 B2 * | 11/2015 | Chen | ................... | B25B 27/0035 |
| 9,309,937 B2 * | 4/2016 | Chen | ................... | B25B 27/0035 |
| 9,511,487 B2 * | 12/2016 | Chen | ..................... | B25B 27/023 |
| 9,657,792 B2 * | 5/2017 | Chen | ..................... | B25B 27/023 |

(Continued)

OTHER PUBLICATIONS

Lisle 2500 Rear Disc Brake Caliper Tool; screen shot taken from Amazon.com on Oct. 28, 2022.

*Primary Examiner* — Jason L Vaughan
(74) *Attorney, Agent, or Firm* — RYAN KROMHOLZ & MANION, S.C.

(57) ABSTRACT

A tool for retracting pistons into cylinder bores is disclosed. A plurality of centering cones are provided to engage with a multitude of piston sizes and configurations. A user selects an appropriately sized centering cone and engages the selected centering cone with a spring loaded distal pusher portion of said tool. A female threaded collar and spreader plate combination receives a male threaded thrust bolt. The male threaded thrust bolt carries the spring loaded distal pusher portion. The spreader plate is pressed against a face of the caliper assembly, and rotation of the male threaded thrust bolt by a driver, such as a ratchet wrench or impact gun, applies inward and rotating forces from the spring loaded distal pusher portion of said tool to the piston, while separating the spring loaded distal pusher portion of said tool from the spreader plate.

12 Claims, 5 Drawing Sheets

(56) References Cited

U.S. PATENT DOCUMENTS

| | | |
|---|---|---|
| 10,099,356 B2 * | 10/2018 | Wang ................. B25B 27/0035 |
| 11,384,803 B1 | 7/2022 | Garrettson |
| 2004/0123438 A1 | 7/2004 | Kang |
| 2004/0134052 A1 | 7/2004 | Ploeger et al. |
| 2011/0010906 A1 | 1/2011 | Mitchell |
| 2012/0216380 A1 | 8/2012 | Chen |
| 2017/0248181 A1 * | 8/2017 | Wang ................. F16D 65/0043 |

* cited by examiner

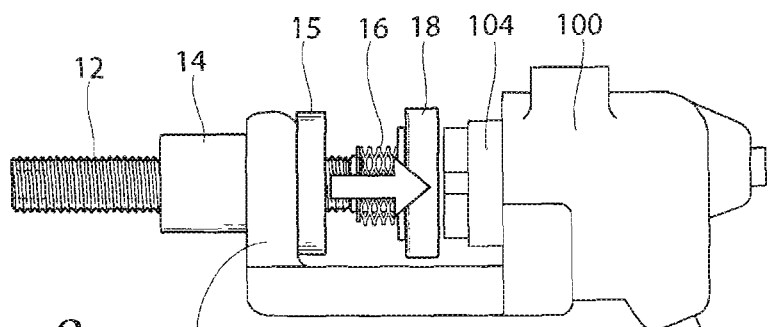
Fig. 8
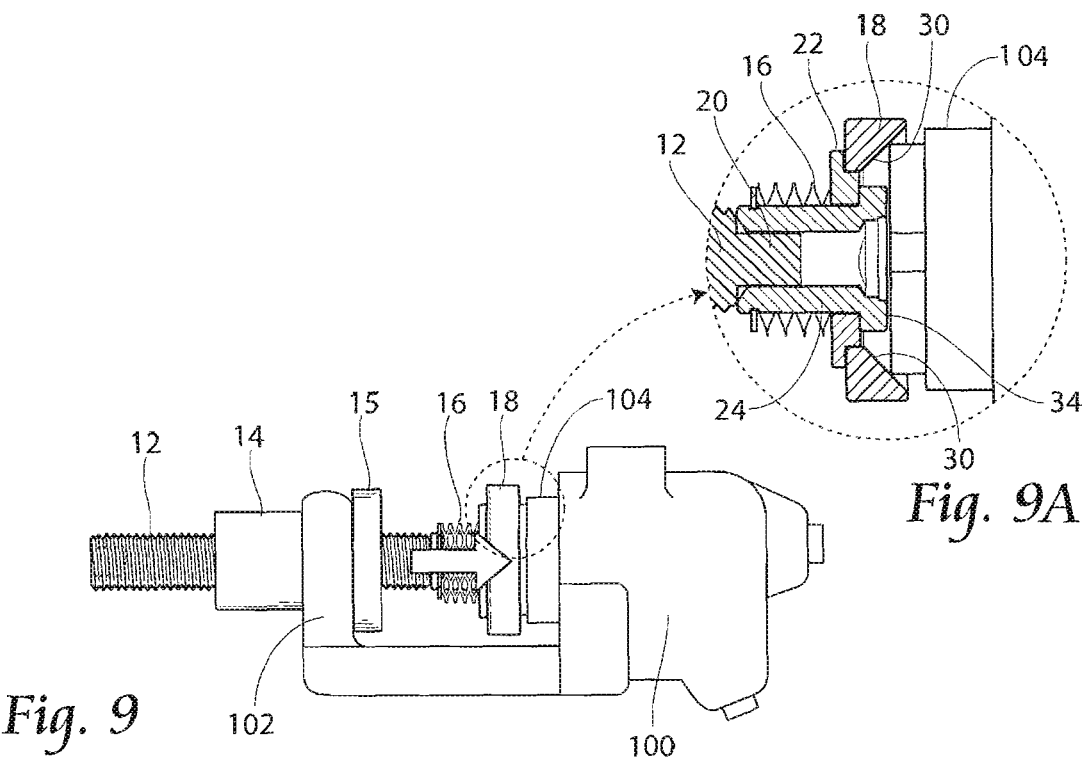
Fig. 9A
Fig. 9

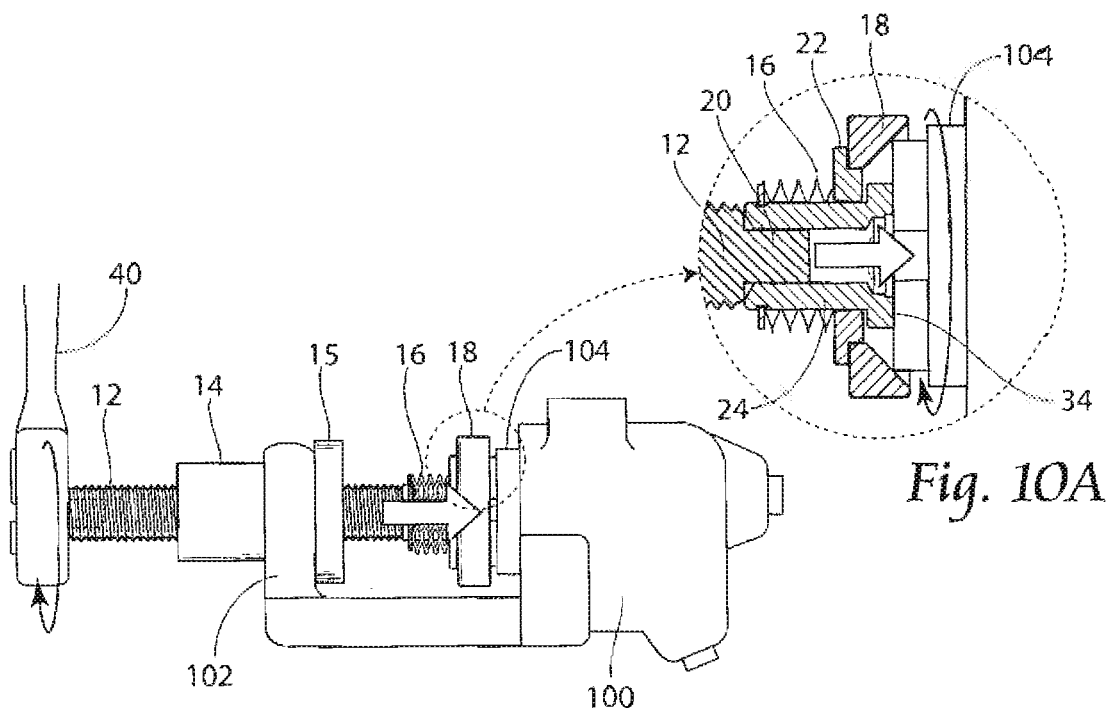
Fig. 10
Fig. 10A
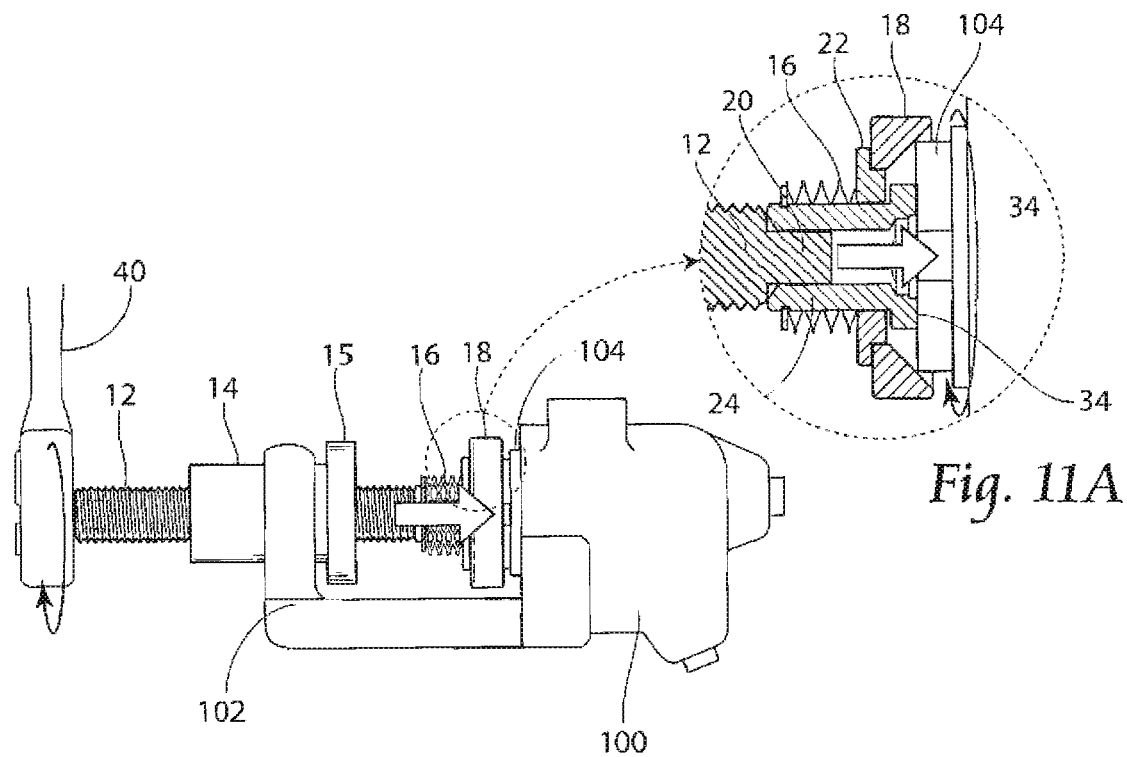
Fig. 11
Fig. 11A

REAR BRAKE CALIPER PRESS

BACKGROUND OF THE INVENTION

In the repair of vehicle braking systems having disc brakes, various special tools are desirable. Disc brakes typically include a caliper housing which is positioned adjacent a vehicle wheel assembly having a rotor or brake disc rotatably mounted therewith. The caliper housing is associated with at least one piston which moves back and forth in a cylinder, and includes a pair of opposed brake pads for clamping the rotor in response to movement of the piston. When a vehicle operator activates a foot brake or a handle brake, brake fluid is forced from a master cylinder into the cylinder associated with the caliper housing to push the piston(s), and force engagement of the brake pads against the rotor to stop rotation of the wheel. When linings of the brake pads are worn too thin under a certain thickness after a period of use, the brake pads are required to be replaced with new ones to maintain a proper braking force during driving. However, with a continuous wearing to the linings of the brake pads, the piston gradually travels outwardly into the interior of the caliper housing to make the space of accommodating the brake pads progressively narrower. In such circumstances, the caliper housing is typically removed from the wheel assembly for the vehicle, and a special tool is used to spread the brake pads apart and/or to force or press the piston(s) back to an initial position in the cylinder(s) after which the brake pads can be replaced. The caliper housing can then be reinstalled in the wheel assembly and positioned with the new brake pads adequately accommodated in the caliper housing for engagement with the rotor.

For rear brakes on cars, pushing in a piston is particularly challenging. It is not just a hydraulic piston where there is fluid behind the piston that you can push back like a front caliper. In rear brake systems, there is also typically a high-helix internal thread such that when the parking brake is engaged, the high-helix internal thread keeps outward pressure on the piston. Therefore, rear brake caliper tools must both push inwardly on the piston, and twist the piston in order to retract the piston into the caliper housing.

Pistons on rear brakes typically have a varying number of detents on the outward facing surface of the piston. Prior art devices are ordinarily supplied in kits with a large number of adaptors configured for a variety of different detent patterns. The adaptors engage the detents on the piston and rotatably drive the pistons inwardly. The operator must search for and choose from the variety of adaptors in order to properly engage the detent pattern.

A variety of spreader and brake press tools are known to be used by mechanics responsible for the repair of disc brakes and the replacement of brake pads. A difficulty with these tools, however, is the manual effort often required to effect retraction of the one or more pistons associated with the caliper housing. Accordingly, there remains a need in servicing brake pads to provide a tool for effectively retracting the one or more pistons of various caliper housing designs with improved mechanical advantage and ease of use.

SUMMARY OF THE INVENTION

The present disclosure relates to a disc brake piston retractor tool for retracting a piston into a cylinder bore of a caliper assembly provided with a set of brake pads to be serviced.

In a preferred embodiment, a plurality of centering cones are provided to engage with a multitude of piston sizes and configurations, including different brake piston diameters. A preferred centering cone will match the size of the brake piston. A user selects an appropriately sized centering cone from the provided centering cones, and engages the selected centering cone with a tool.

A spring loaded distal pusher portion of said tool receives the centering cone. A preferably female threaded collar and spreader plate combination receives a male threaded thrust bolt. The male threaded thrust bolt carries the spring loaded distal pusher portion. In this manner, the spreader plate is pressed against a face of the caliper assembly, and rotation of the male threaded thrust bolt by a driver, such as a ratchet wrench or impact gun, applies pushing and rotating forces from the spring loaded distal pusher portion of said tool to the piston, while separating the spring loaded distal pusher portion of said tool from the spreader plate.

BRIEF DESCRIPTION OF THE DRAWINGS

FIG. 8 is a side in-use view of the brake caliper tool of FIG. 1 positioned within the caliper housing and proximal to the piston to be retracted, with the centering cone approaching the piston to be retracted.

FIG. 9 is a side in-use view of the brake caliper tool of FIG. 1 positioned within the caliper housing, with the centering cone engaging the piston to be retracted.

FIG. 9A is a cross sectional view of portions of the brake caliper tool of FIG. 1 with the centering cone engaging the piston to be retracted.

FIG. 10 is a side in-use view of the brake caliper tool of FIG. 1 positioned within the caliper housing, with the centering cone engaging the piston to be retracted, and pushing and turning forces being applied to the tool by a socket or impact wrench.

FIG. 10A is a cross sectional view of portions of the brake caliper tool of FIG. 1 with the centering cone engaging the piston to be retracted, and pushing and turning forces being applied to retract the piston into the caliper housing.

FIG. 11 is a side in-use view of the brake caliper tool of FIG. 1 positioned within the caliper housing, with the centering cone engaging the piston to be retracted, and pushing and turning forces being applied to the tool by a socket or impact wrench, with the piston fully retracted.

FIG. 11A is a cross sectional view of portions of the brake caliper tool of FIG. 1 with the centering cone engaging the piston to be retracted, and pushing and turning forces being applied, with the piston fully retracted.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
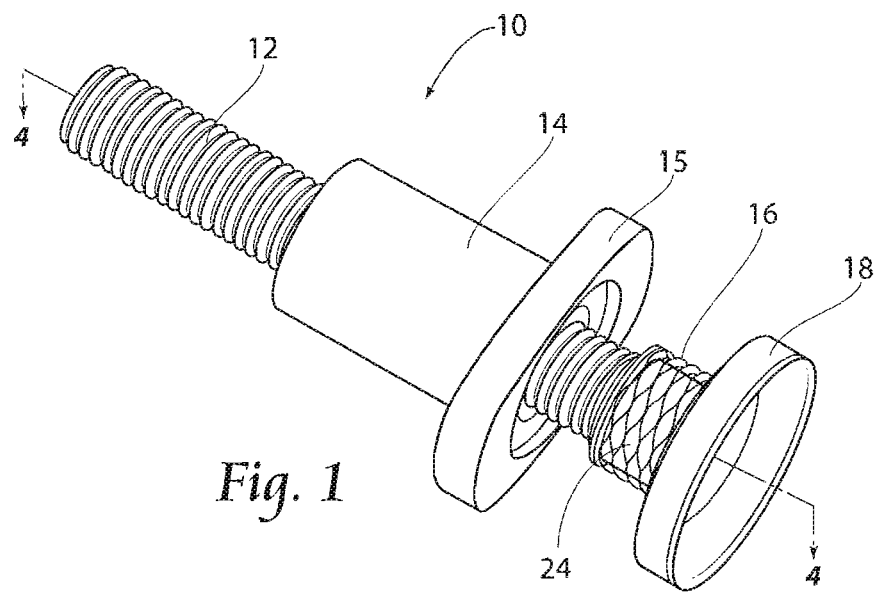
FIG. 1 is a perspective view of portions a disc brake caliper tool according to the present invention.

Referring now to FIG. 1, a disc brake piston retractor tool 10 used for compressing a piston into a caliper housing when replacing a set of brake pads installed therein is shown.

A male threaded rod 12 carries a female threaded collar 14. The threaded collar 14 is provided with a spreader plate 15 which engages a portion of the caliper housing as will be described later. A spring 16 surrounds pusher socket 24. A centering ring 18 is coupled to the pusher socket 24.

Figure 2:
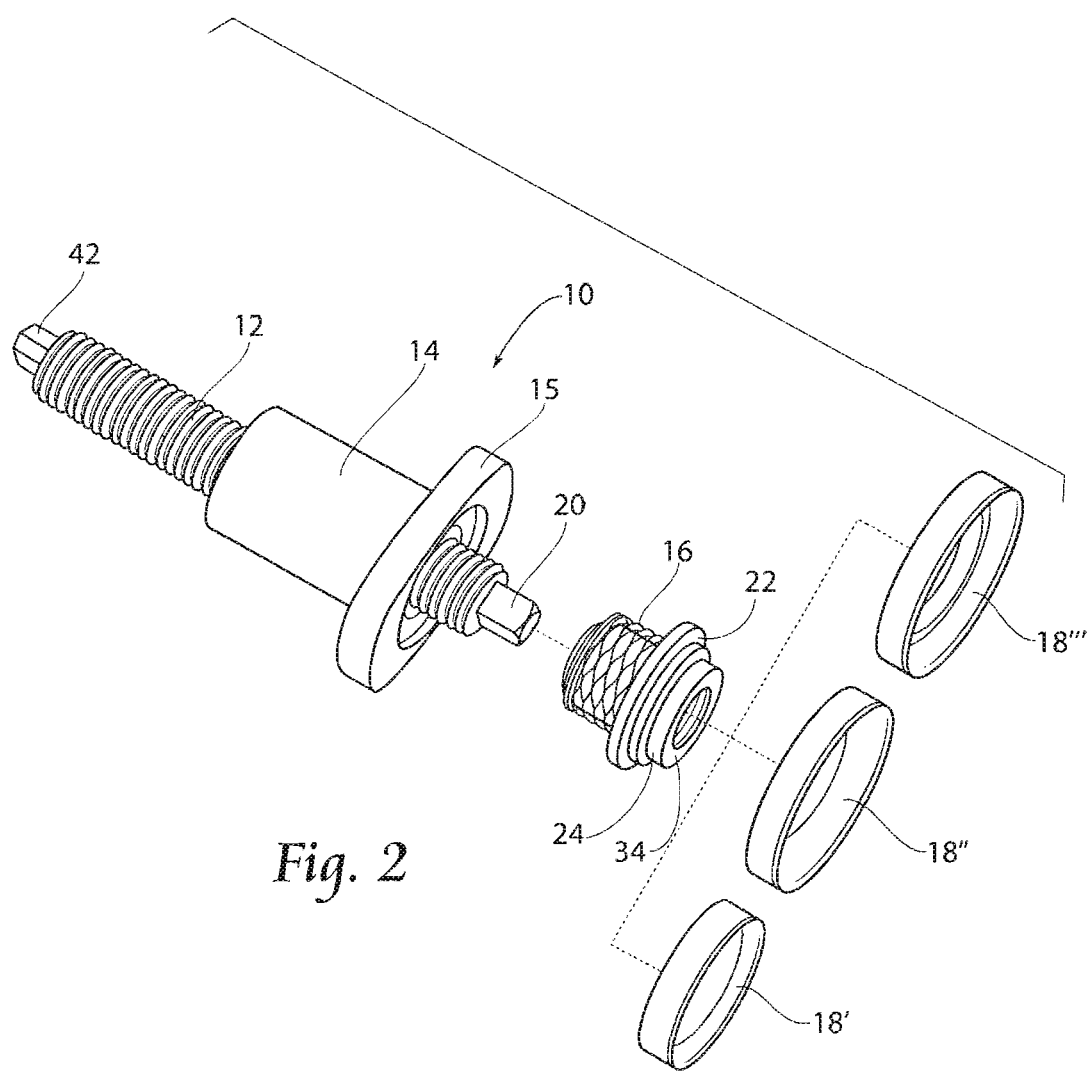
FIG. 2 is a partially exploded perspective view of the brake caliper tool of FIG. 1.
Figure 3:
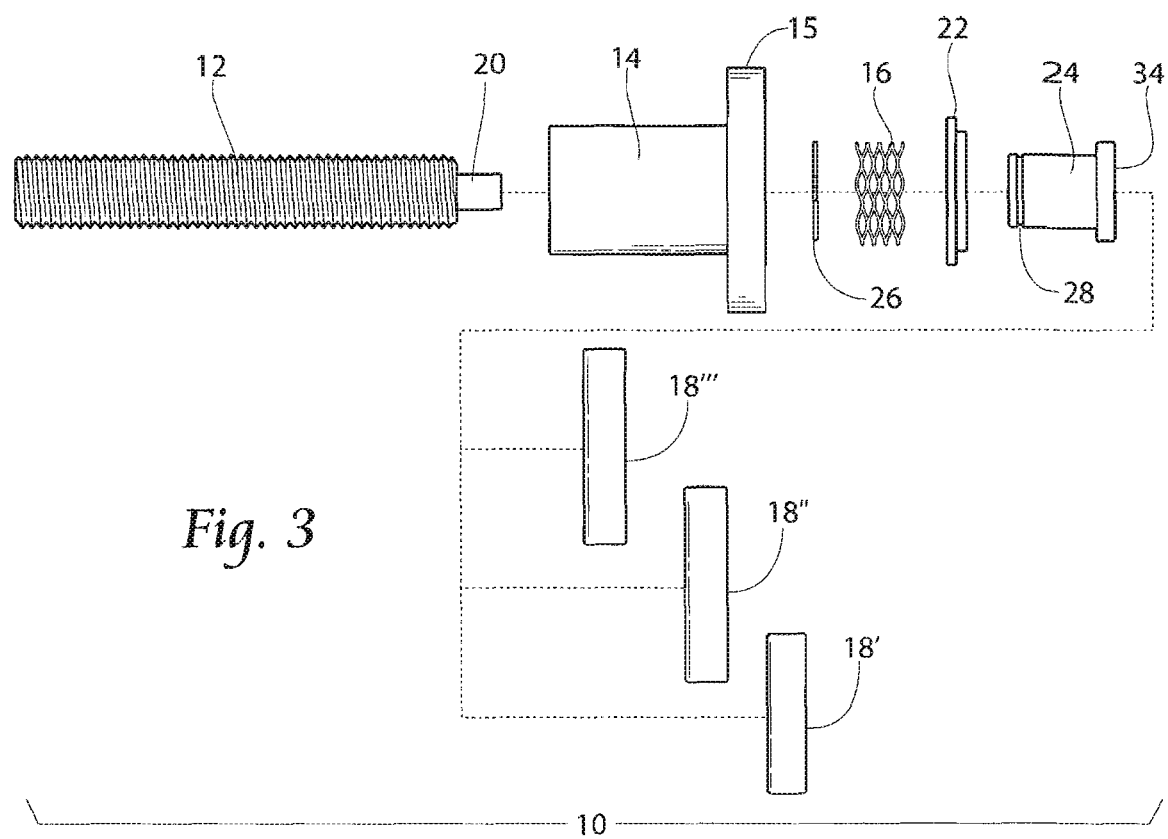
FIG. 3 is a side exploded view of the disc brake caliper tool brake caliper tool of FIG. 1.

FIG. 2 is a partially exploded perspective view of the brake caliper tool 10 of FIG. 1, and FIG. 3 is a fully exploded view of the tool 10. A threaded rod male end 20 is coupled through threaded collar 14, past spreader plate 15, and through pusher socket 24. Pusher socket 24 carries a snap ring 26 (for coupling about washer groove 28) and step washer 22. Pusher socket face 34 ultimately contacts the piston 104 as will be described later.

A plurality of centering rings of increasing radius 18', 18" and 18''' are provided. In use, a user selects between one of centering rings of increasing radius 18', 18" and 18''' for optimal fit about piston 104.

Figure 4:
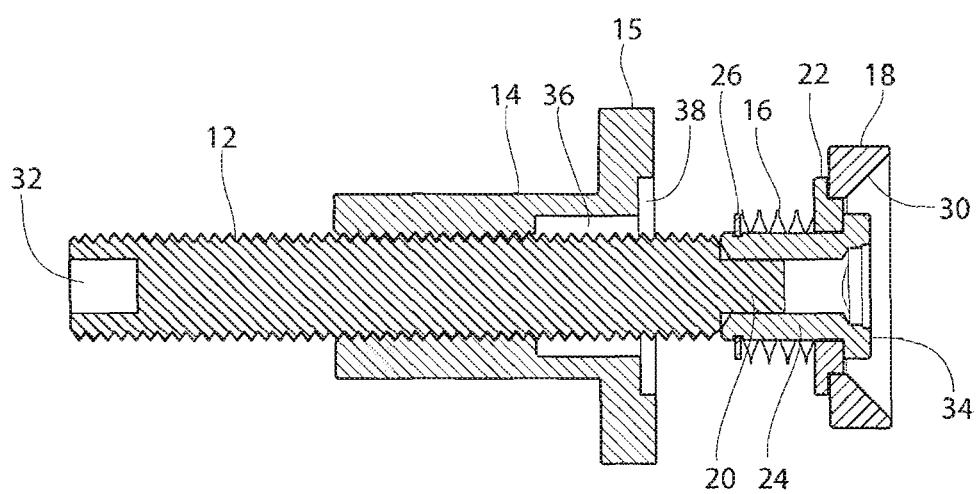
FIG. 4 is a cross-sectional view of the tool shown in FIG. 3.

FIG. 4 is a cross-sectional view of the tool shown in FIG. 3. As can be seen, threaded collar 14 threadedly receives threaded rod 12 in engaging fashion. Centering rings of increasing radius 18', 18" and 18''' comprise a centering slope 30, along which the centering rings of increasing radius 18', 18" and 18''' can self-center about piston 104 of FIG. 5.

Figure 5:
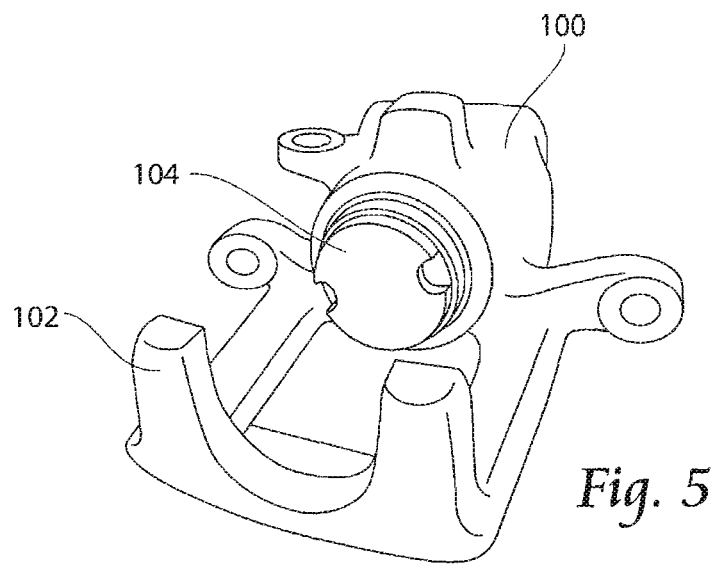
FIG. 5 is a perspective view of a caliper housing and piston to be retracted with the brake caliper tool of FIG. 1.
Figure 6:
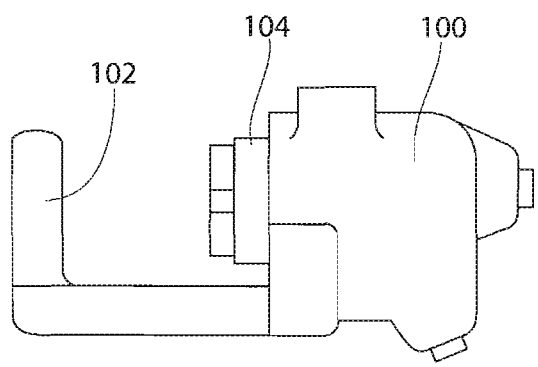
FIG. 6 is a side view of a caliper housing and piston to be retracted.

FIG. 5 is a perspective view of a caliper housing 100, caliper frame 102, and piston 104 to be retracted with the brake caliper tool of FIG. 1. FIG. 6 is a side view of the elements shown in FIG. 5.

Figure 7:
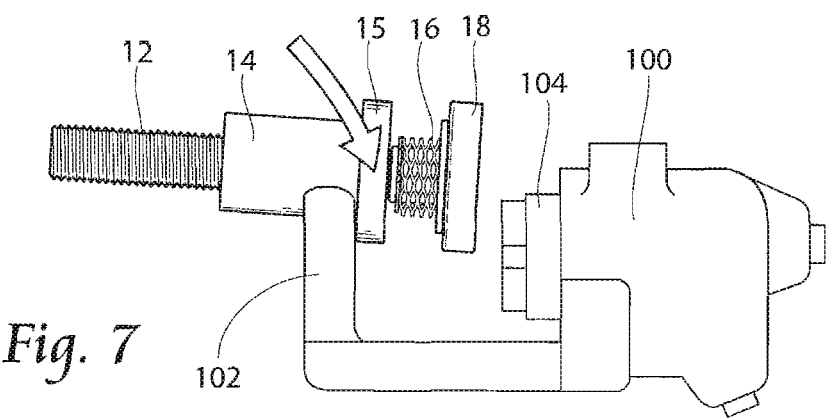
FIG. 7 is a side in-use view of the brake caliper tool of FIG. 1 being positioned within the caliper housing and proximal to the piston to be retracted.

FIGS. 7-11 shown the brake caliper tool 10 in use. Referring now to FIG. 7, a side in-use view of the brake caliper tool 10 of FIG. 1 is shown, the tool 10 being positioned within the caliper housing 100 and proximal to the piston 104 to be retracted. Spreader plate 15 is placed between caliper 104 and caliper frame 102.

Referring now to FIG. 8, a side in-use view of the brake caliper tool 10 of FIG. 1 is shown positioned within the caliper housing and proximal to the piston 104 to be retracted, with the centering cone 18 approaching the piston 104 to be retracted. Centering cone 18 can be advanced toward piston 104 by manually turning threaded rod 12, or placing a socket or impact wrench 40 (see FIG. 10) into threaded rod wrench receiver 32 (see FIG. 4). Alternatively, as shown in FIG. 2, instead of a threaded rod wrench receiver 32, a hexagonal drive head 42 can be used.

As shown in FIG. 9, the centering cone 18 eventually engages the piston 104 to be retracted, as shown in close up in FIG. 9A. The centering slope 30 of centering cone 18 self-centers the centering cone 18 on the piston 104. As shown in FIGS. 10 and 10A, rotation of wrench 40 advances pusher socket 24, and particularly pusher socket face 34 of pusher socket 24 into engaging contact with piston 104. Continued rotation of wrench 40 urges spreader plate 15 against caliper frame 102, spreading spreader plate 15 from pusher socket 24. Pusher socket 24 receives the rotational and pushing forces from wrench 40 operating on threaded rod 12, and pusher socket face 34 of pusher socket 24 applies both pushing and rotational forces to piston 104 to retract piston 104 into the caliper housing 100. Spring 16 initially urges centering cone 18 into contact with piston 104, but as centering cone 18 advances toward piston 14, spring 16 allows the centering ring 18 to yield to pusher socket face 34 engaging piston 104. The application of pushing and rotational forces to piston 104 to retract piston 104 into the caliper housing 100 continues until piston 104 is fully retracted as shown in FIGS. 11 and 11A.

Following full retraction of piston 104 into caliper housing 100 as shown in FIG. 11, the wrench 40 can be rotated counterclockwise (not shown) to remove the tool 10 from engagement with caliper housing 100.

It will be appreciated that threaded road 12 could be threaded left handed or right handed.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A disc brake piston retractor tool for retracting at least one piston into at least one cylinder bore of a caliper assembly provided with a set of brake pads to be serviced, the tool comprising:
    a threaded rod;
    a threaded collar carried by said threaded rod;
    a pusher socket carried by a distal portion of said threaded rod said pusher socket comprising a pusher socket face;
    a centering ring carried by said pusher socket;
    said pusher socket face and said centering ring both configured to directly contact said at least one piston.

2. A disc brake piston retractor tool according to claim 1, the tool further comprising:
    a step washer carried by said pusher socket.

3. A disc brake piston retractor tool according to claim 1, the threaded collar further comprising a spreader plate at a distal portion of said threaded collar.

4. A disc brake piston retractor tool according to claim 1, the threaded rod comprising a wrench receiver at a proximal portion of said threaded rod.

5. A disc brake piston retractor tool for retracting at least one piston into at least one cylinder bore of a caliper assembly provided with a set of brake pads to be serviced, the tool comprising:
    a threaded rod;
    a threaded collar carried by said threaded rod;
    a pusher socket carried by a distal portion of said threaded rod;
    a centering ring carried by said pusher socket; and
    a spring carried by said pusher socket.

6. A disc brake piston retractor tool according to claim 5, the threaded collar further comprising a spreader plate at a distal portion of said threaded collar.

7. A disc brake piston retractor tool according to claim 5, the threaded rod comprising a wrench receiver at a proximal portion of said threaded rod.

8. A disc brake piston retractor tool for retracting at least one piston into at least one cylinder bore of a caliper assembly provided with a set of brake pads to be serviced, the tool comprising:
    a threaded rod;
    a threaded collar carried by said threaded rod;
    a pusher socket carried by a distal portion of said threaded rod;
    a centering ring carried by said pusher socket; and the centering ring comprising an interior surface of increasing radius.

9. A disc brake piston retractor tool according to claim 8, the threaded collar further comprising a spreader plate at a distal portion of said threaded collar.

10. A disc brake piston retractor tool according to claim 8, the threaded rod comprising a wrench receiver at a proximal portion of said threaded rod.

11. A disc brake piston retractor tool according to claim 8, wherein the centering ring comprising an interior surface of increasing radius comprises a centering slope.

12. A disc brake piston retractor tool according to claim 8, wherein the centering ring comprising an interior surface of increasing radius comprises a cone.

\* \* \* \* \*